United States Patent
Banag (10) Patent No.: US 9,768,682 B2
(45) Date of Patent: Sep. 19, 2017

(54) SWITCHED CAPACITORS WITH INVERTED BREAK-BEFORE-MAKE WITHOUT EXTERNAL FILTERING LOAD CAPACITOR

(71) Applicant: Dialog Semiconductor (UK) Limited, Reading (GB)

(72) Inventor: Franck Banag, Edinburgh (GB)

(73) Assignee: Dialog Semiconductor (UK) Limited, Reading (GB)

( * ) Notice: Subject to any disclaimer, the term of this patent is extended or adjusted under 35 U.S.C. 154(b) by 0 days.

(21) Appl. No.: 14/821,976

(22) Filed: Aug. 10, 2015

(65) Prior Publication Data

US 2017/0047839 A1    Feb. 16, 2017

(51) Int. Cl.
G05F 1/10      (2006.01)
G05F 3/02      (2006.01)
H02M 3/07     (2006.01)

(52) U.S. Cl.
CPC ..................... H02M 3/07 (2013.01)

(58) Field of Classification Search
CPC .. H02M 3/073; H02M 3/07; H02M 2003/077; G11C 5/145; G05F 3/205
USPC ...................... 327/536; 363/59–60
See application file for complete search history.

(56) References Cited

U.S. PATENT DOCUMENTS

| | | | | |
|---|---|---|---|---|
| 6,369,642 B1 * | 4/2002 | Zeng | ..................... | H02M 3/073 327/536 |
| 7,279,957 B2 * | 10/2007 | Yen | ......................... | H02M 3/07 327/536 |
| 7,652,522 B2 * | 1/2010 | Racape | ................... | G11C 5/145 327/536 |
| 2002/0190786 A1 * | 12/2002 | Yoon | ...................... | H04B 1/719 329/313 |
| 2012/0187928 A1 | 7/2012 | Parto et al. | | |
| 2012/0236672 A1 * | 9/2012 | Lee | ......................... | H02M 1/15 365/226 |
| 2013/0200863 A1 | 8/2013 | Hung et al. | | |
| 2014/0132232 A1 | 5/2014 | MacLean et al. | | |
| 2014/0210437 A1 | 7/2014 | Chen | | |

OTHER PUBLICATIONS

"Switched-Capacitor Power Electronics Circuits," by Adrian Ioinovici, Technical Committees, Circuits and Systems Magazine, IEEE vol. 1, Issue 3, pp. 37-42, Jul. 1, 2001.
"Charge Pump Circuits: An Overview on Design Strategies and Topologies," by Gaetano Palumbo et al, IEEE Circuits and Systems Magazine, vol. 10, Issue 1, pp. 31-45, Jan. 1, 2010.

(Continued)

*Primary Examiner* — Quan Tra
(74) *Attorney, Agent, or Firm* — Saile Ackerman LLC; Stephen B. Ackerman (57) ABSTRACT

A charge pump circuit using more than one parallel source is described. A flying capacitor of the charge pump maintains a break-before-make time with respect to the switches within a side of the charge pump. A flying capacitor of the charge pump takes advantage of a make-before-break time with respect to the switches between the sides of the charge pump. This results in the shared load of the charge pump always receiving current from a flying capacitor. This slight change of control of the flying capacitor switching phases removes the need for a filtering capacitor within the charge pump.

15 Claims, 10 Drawing Sheets

(56) References Cited

OTHER PUBLICATIONS

"Analysis and Design of Makowski Charge-Pump Cell," by Lifang Liu et al., ASIC, 2005. ASICON 2005. 6th International Conference, vol. 1 pp. 497-502, Oct. 2005.

"The Effect of Switching Transitions on Switched Capacitor Converters Losses," by Michael Evzelman et al., 2012 IEEE 27th Convention of Electrical and Electronics Engineers in Israel, pp. 1-5, Nov. 2012.

\* cited by examiner

SWITCHED CAPACITORS WITH INVERTED BREAK-BEFORE-MAKE WITHOUT EXTERNAL FILTERING LOAD CAPACITOR

BACKGROUND OF THE INVENTION

Field of the Invention

The present disclosure relates generally to charge pump circuits and more specifically to switched-capacitor power electronic circuits.

Description of Related Art

In power conversion solutions, from DC to DC or AC to DC, switching capacitor architecture solutions are used. They consist of capacitors that are switched to move electrical charges from a voltage source such as a battery to an electric network or load.

Charge Pump Circuits: An Overview on Design Strategies and Topologies by Palumbo (2010), describes how charge pumps circuits are widely used in integrated circuits devoted to several kind of applications such as smart power, non-volatile memories, switched capacitor circuits, operational amplifiers, voltage regulators, SRAMs, LCD drivers, piezoelectric actuators, RF antenna switch controllers, etc., due to the continuous power supply reduction.

Switched-Capacitor Power Electronic Circuits by Ioinovici (2002), describes the main orientations in power electronics in the last decade with the development of switching-mode converters without inductors and transformers. These converters are lightweight, small size and high power density as the result of using only switches and capacitors in the power stage. Thus, they serve as ideal power supplies for mobile electronic systems (e.g. cellular phones, personal digital assistants, and so forth). Switched-capacitor (SC) converters, with their large voltage conversion ratio, are a response to such challenges of the 21st century as high-efficiency converters with low EMI emissions and the ability to realize steep step-down of the voltage (to 3V or even a smaller supply voltage for integrated circuits) or steep step-up of the voltage for automotive industry or internet services in the telecom industry.

Most topologies of charge pumps are based on three types: Dickson, crossconnecting, and Makowski, as described in Analysis and Design of Makowski charge-pump cell by Liu (2005). They are composed of capacitors that are switching between different voltage levels (flying capacitors) and capacitors connected to the load (filtering capacitors). The flying capacitors are used to transfer the charge from the battery source to the load. Those architectures have typically two or more phases that are of two types, one used to recharge the flying capacitor, and the second to discharge the flying capacitor.

Figure 1:
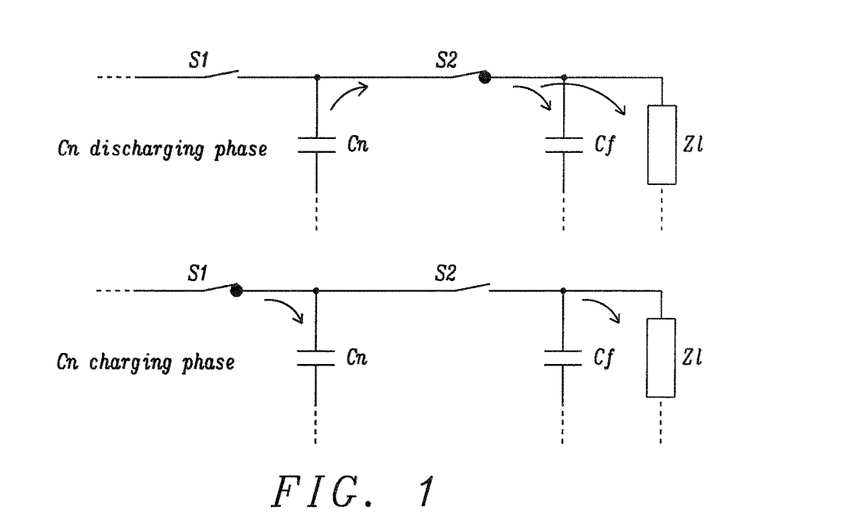
FIG. 1 shows a circuit diagram of a related art charge pump core, with switching capacitors Cn (flying) and Cf (filtering).

FIG. 1 shows a classical charge pump latest stage with switching capacitors Cn (flying) and Cf (filtering) of the related art. The Cn capacitors are part of the charge pump core that can be of different architectures. The Cf capacitors have always been required and act as an all time available energy reserve connected to the load. This ensures continuous current through the load during the Cn charging phases and during transitions. Typically one of the nodes of the Cn capacitor connected to the load in the last stage through one switch (S2), is also connected to the previous stage through another switch (S1), and it is important to avoid closing, and passing current in, both switches (S1&S2) at the same time. Switch S1 or S2 is most likely a MOS transistor driven with a signal from a driver circuit that turns on (closes the switch) and off (opens the switch) the device to operate it as a switch.

Figure 2:
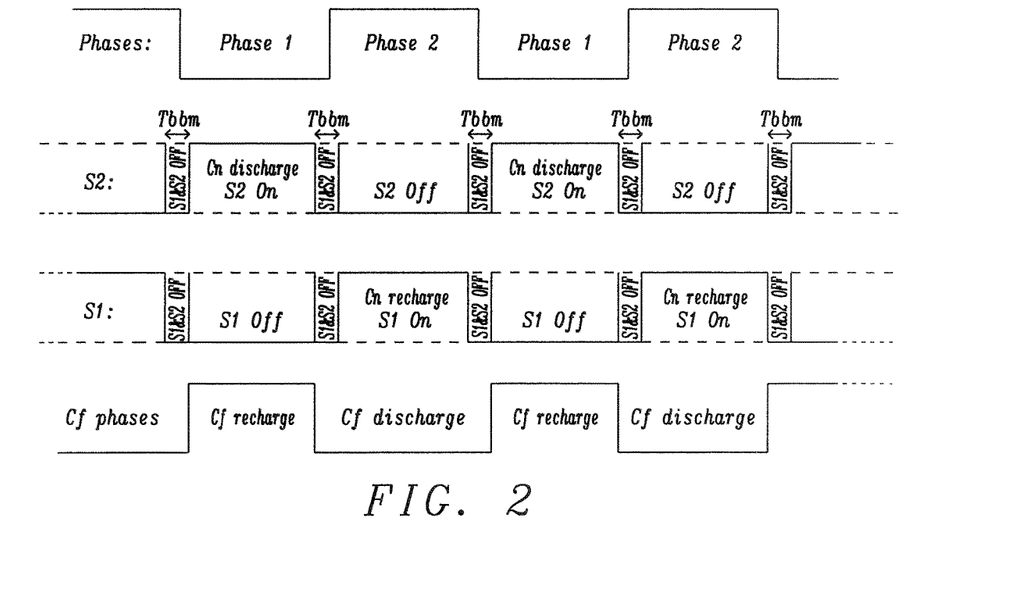
FIG. 2 illustrates a signal diagram of Cn capacitor discharge and recharge phases with Tbbm (break-before-make) of the related art.

FIG. 2 illustrates Cn (flying) capacitor discharge and recharge phases with Tbbm (break before make) time of the related art. The discharge phase and charge phase are controlled independently and a minimum break-before-make time, between closing the first switch (S1) and opening the second switch (S2), is guaranteed by design.

Figure 3:
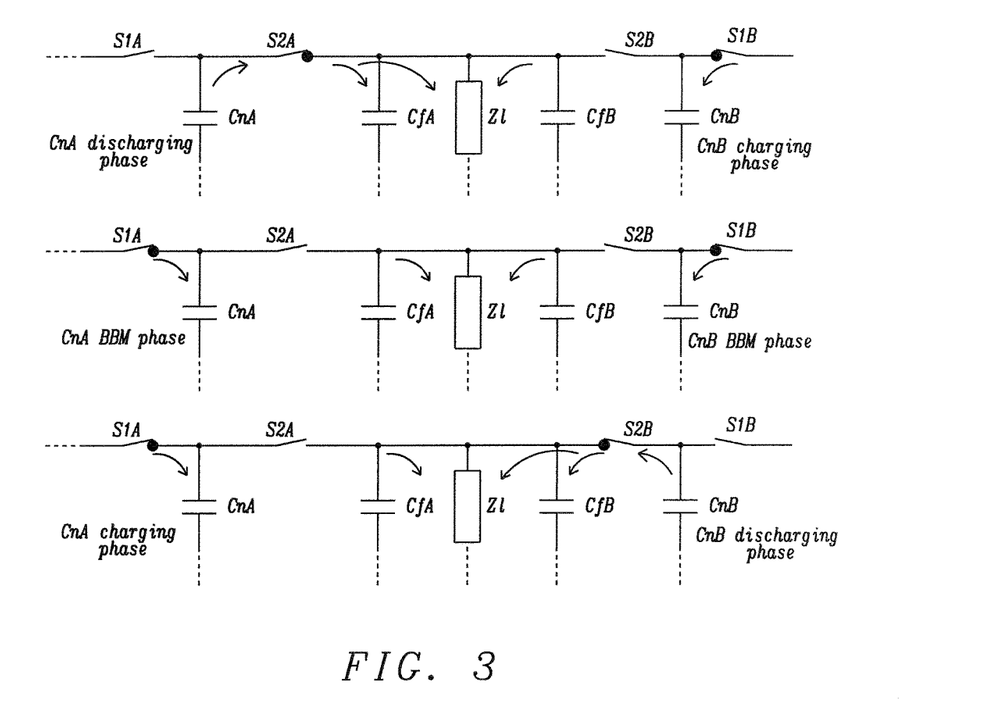
FIG. 3 shows a circuit diagram of charge pumps working in parallel.

FIG. 3 shows a circuit diagram of charge pumps of the related art. Interleaved structures have been proposed where two or more charge pumps (A&B) are working in parallel. This has the advantage to increase the output power and reduce the requirement on the Cf (filtering) capacitors, now delivering charge to the load only during Tbbm (break-before-make) time, instead of the full half-period.

Figure 4:
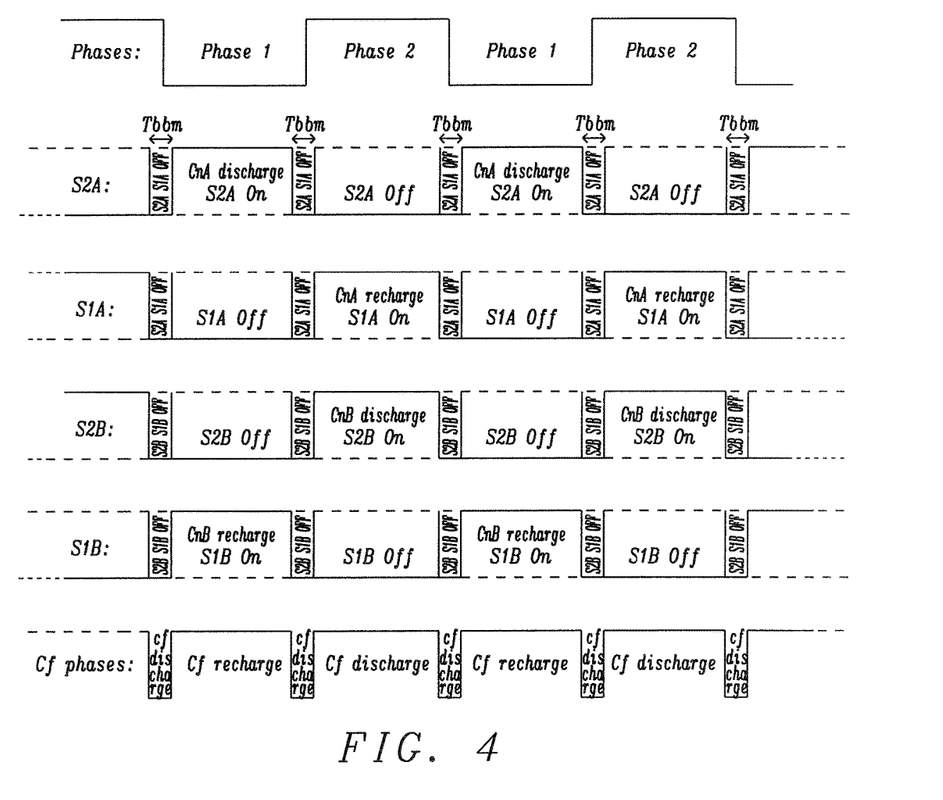
FIG. 4 illustrates a signal diagram of CnA and CnB capacitor discharge and recharge phases with Tbbm for charge pumps working in parallel.

FIG. 4 illustrates a signal diagram of CnA and CnB (flying) capacitor discharge and recharge phases with Tbbm (break-before-make) times, for two charge pumps working in parallel of the related art. The time that the load current is delivered only by the Cf (filtering) capacitors is now Tbbm, instead of the full half-period, which allows use of a smaller value for Cf.

SUMMARY OF THE INVENTION

Accordingly, it is an object of one or more embodiments of the present disclosure to provide two or more charge pump circuits working in parallel, where the non-recovery time of break-before-make is maintained for the switched flying capacitor in one side of the charge pump, and the recovery time of make-before-break between flying capacitors of each side of the charge pump provides for a current to the load.

It is a further object of one or more embodiments of the disclosure to eliminate the requirement for the filtering capacitor connected to the load of a charge pump circuit, thereby minimizing the number of external components in a high power DC-DC power converter while maintaining high efficiency. Other objects will appear hereinafter.

The above and other objects of the present disclosure may be accomplished in the following manner. Switches in the charge pump circuit are connected to a source, and provide a means for a flying capacitor to charge in one side of the charge pump. Switches in the charge pump circuit are connected to a load, and provide a means for a flying capacitor to discharge in one side of the charge pump. A flying capacitor in the charge pump circuit provides a current to a shared load between each side of the charge pump. Because of the short make-before-break time that flying capacitors of each side of the charge pump are simultaneously discharging, a shared load between each side of the charge pump always receives current from a flying capacitor. A filtering capacitor is no longer needed to provide current to a load in the charge pump circuit.

The above and other objects are further accomplished by a method of operating a switched-capacitor power electronic circuit, providing two or more charge pump circuits connected in parallel, producing an output power. The method includes each of the charge pump circuits having a flying capacitor for providing a current to a load, and connecting both of the flying capacitors to a load simultaneously after a charging period of one of the flying capacitors and prior to a charging period of the other flying capacitor.

BRIEF DESCRIPTION OF THE DRAWINGS

The present disclosure will be more clearly understood from the following description taken in conjunction with the accompanying drawings in which like reference numerals designate similar or corresponding elements, regions and portions and in which.

DETAILED DESCRIPTION OF THE INVENTION

In one embodiment, the disclosure replaces the non-recovery Tbbm (break-before-make) time measured between the discharge and recharge phases of a Cn flying capacitor on one side of a related art charge pump by a recovery Tmbb (make-before-break) time measured between the two sides of a charge pump working in parallel, and thereby removes the need for the Cf filtering capacitors on either side of the charge pump.

Figure 5:
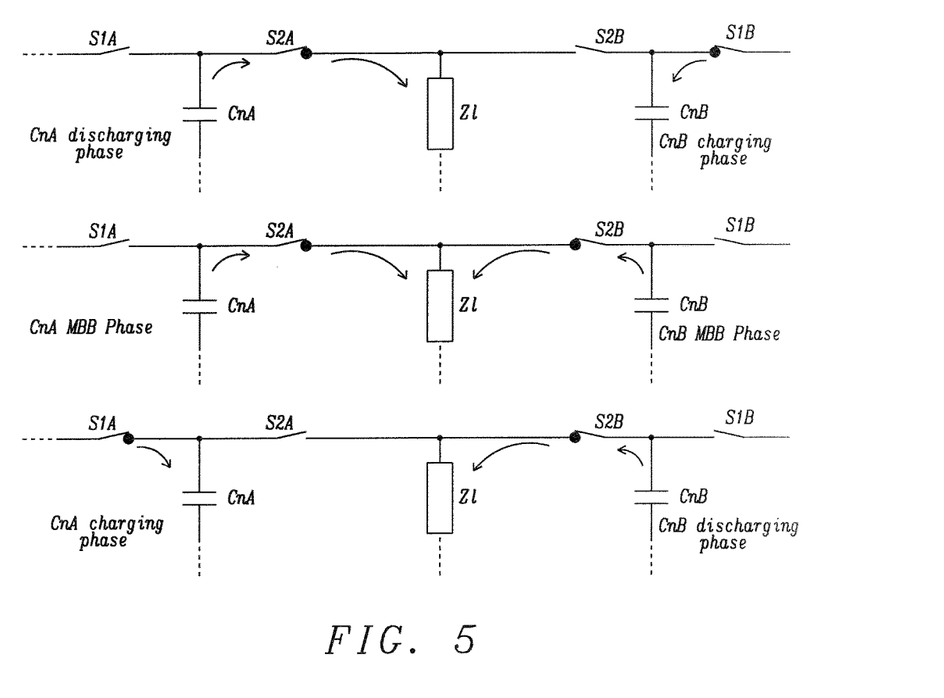
FIG. 5 shows a circuit diagram of charge pumps working in parallel, with Cf capacitors removed, in a first preferred embodiment of the present disclosure.

FIG. 5 shows a circuit diagram of charge pumps working in parallel, with Cf capacitors removed, in a first preferred embodiment of the present disclosure. When capacitor CnA is discharging current to load Z1, switch S1A is off (open) and switch S2A is on (closed). Concurrently, when capacitor CnB is charging, switch S1B is on and switch S2B is off. When CnA changes from discharging to charging, switch S1A turns on and switch S2A turns off, and when CnB changes from charging to discharging, switch S1B turns off and switch S2B turns on. There is a short time during this phase change when both CnA and CnB provide current to the load. The effect of this make-before-break time, when both S2A and S2B are both on, is to remove the need for filtering capacitors, since flying capacitors during this time will always provide load current. Make-before-break switching is well known in the art and is here represented by the timing state diagram of FIG. 6.

Figure 6:
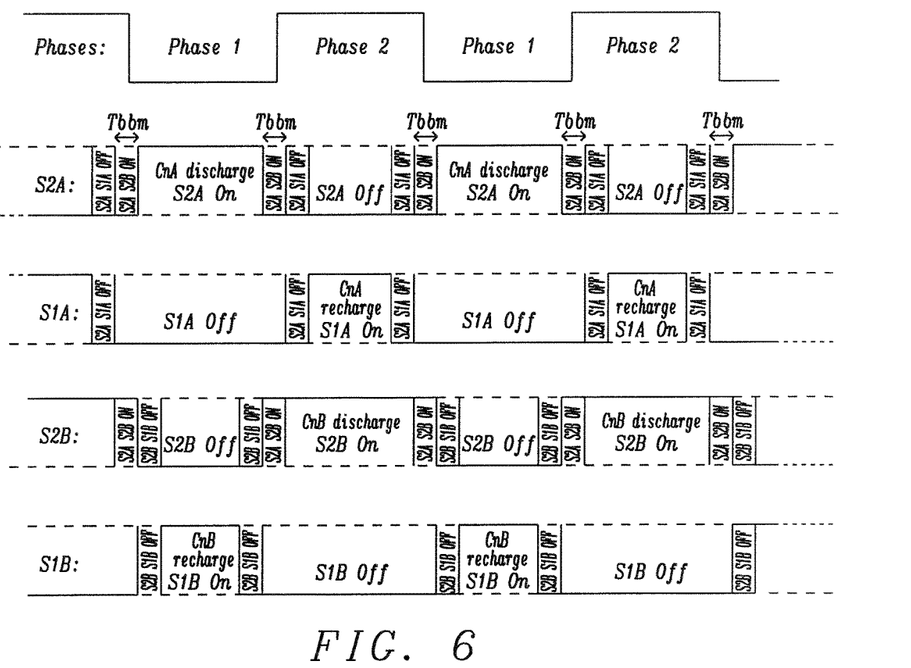
FIG. 6 illustrates a signal diagram of CnA and CnB capacitor discharge and recharge phases with Tbbm (break-before-make) replaced by Tmbb (make before break), in a first preferred embodiment of the present disclosure.

FIG. 6 illustrates a signal diagram of CnA and CnB capacitor discharge and recharge phases with Tbbm (break-before-make) replaced by Tmbb (make-before-break), in a first preferred embodiment of the present disclosure. With charge pumps working in parallel, there is a time Tmbb when both switch S2A and switch S2B are on in the charge pump. This is when CnA is switching to charging and CnB to discharging, or when CnA is switching to discharging and CnB to charging. When both CnA and CnB are switching, CnA and CnB provide current to the load and the Cf capacitor is no longer needed. This slight change on the control of the switching phases allows removal of the filtering capacitor component, which usually is a non-negligible contribution on the overall cost of the DC-DC conversion solution (PCB and/or Die area). This would work for any switch type used in a charge-pump configuration.

Figure 7A:
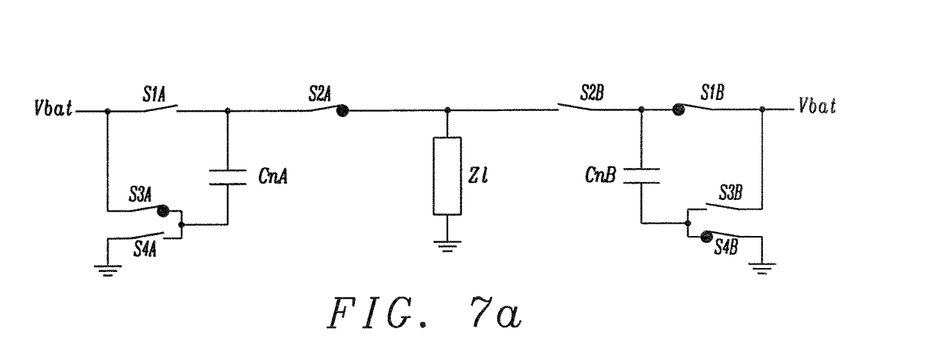
FIG. 7a shows a circuit diagram of a doubler application.

FIG. 7a shows a voltage doubler application. As a first example of the proposed disclosure this circuit illustrates how a voltage supply greater than the battery can be delivered. Here, as is known in the art, each charge pump capacitor (Cna, Cnb), not yet connected to the load, is connected between Vbat and ground to charge the capacitor to Vbat. Vbat is then switched to the lower capacitor plate which raises each capacitor voltage to 2×Vbat. The above disclosed technique is then used to connect each charge pump to the load through switches S2A and S2B.

Figure 7B:
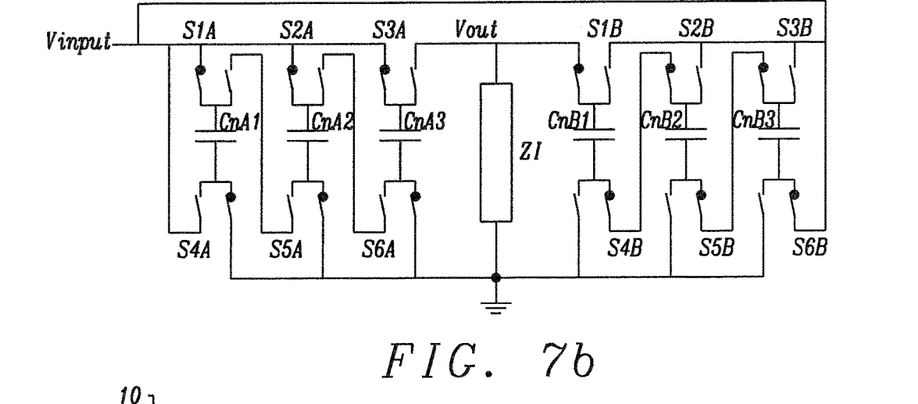
FIG. 7b shows a circuit diagram of a quadrupler application.

This disclosure could also be utilized for any other voltage multiplier besides voltage doubling. As an example, FIG. 7b shows a quadrupler application. The output voltage Vout will be 4 times the input voltage Vinput (no load condition). For that application, as described in the present document, the break-before-make (usual method) is maintained within and between the switches connected to the flying capacitors. The modification, which is to use a make-before-break between the switches of the left side and the switches of the right side, allows removing the filtering capacitor, which in the related art is connected in parallel with the load.

Figure 8:
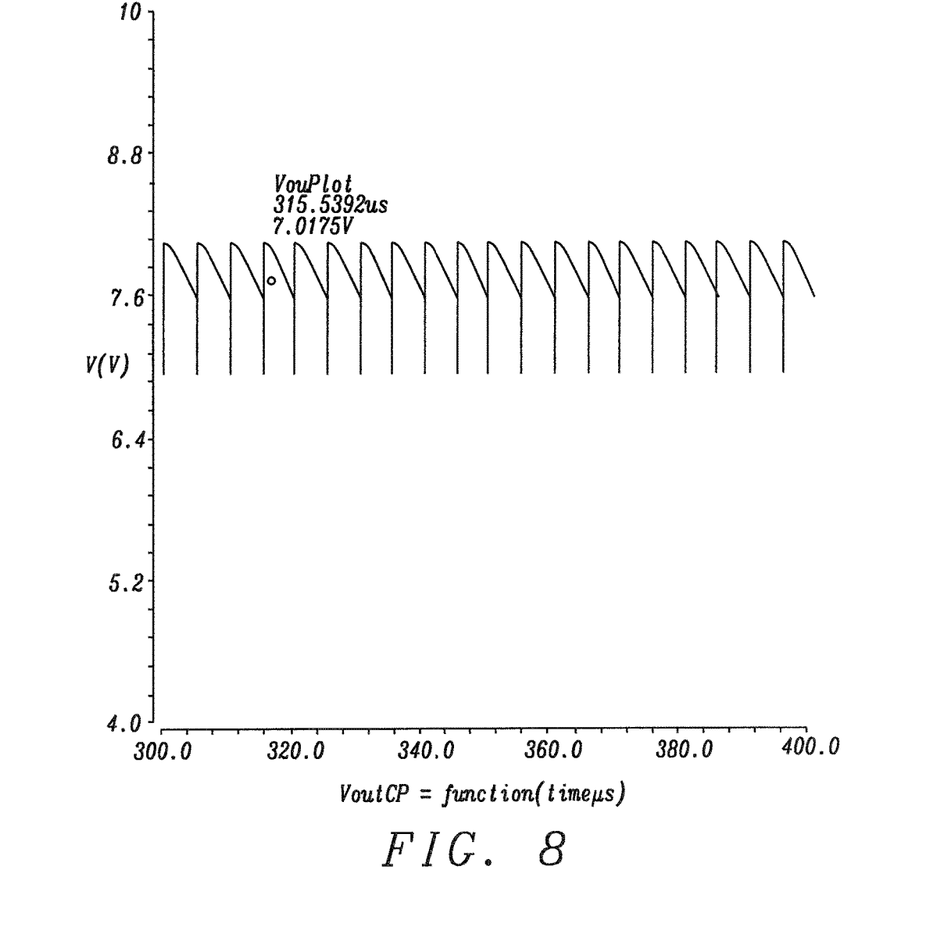
FIG. 8 illustrates a timing diagram of a first simulation for the circuit of FIG. 3, including a filtering capacitor.

FIG. 8 illustrates a timing diagram of a simulation with Tmbb=0 ps, Cn=4.7 uF, and Cf=10 uF for FIG. 3 charge pumps working in parallel. This is the case where the phase on flying capacitor CnA switches from discharging to charging. There is a small break-before-make time between switch S2A and switch S1A as CnA changes phase.

Figure 9:
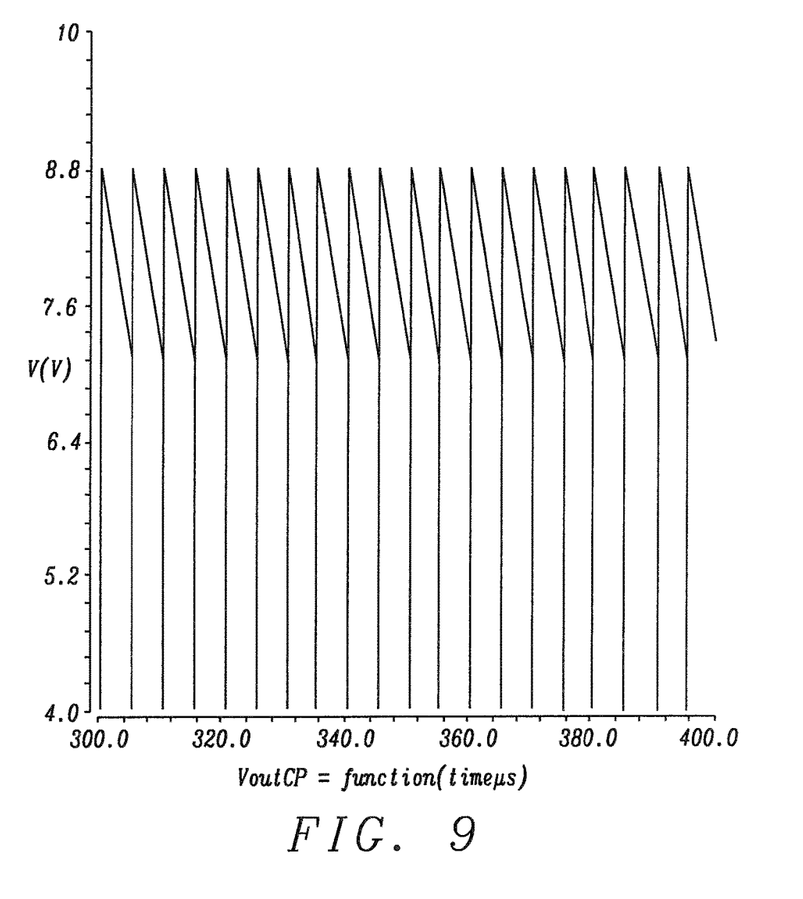
FIG. 9 illustrates a timing diagram of a second simulation for the circuit of FIG. 3, without a filtering capacitor.

FIG. 9 illustrates a timing diagram of a simulation with Tmbb=0 ps, Cn=4.7 uF, and Cf=0fF for FIG. 3 charge pumps working in parallel. This is the case where the filtering capacitor Cf is not connected. The absence of the filtering capacitor in that configuration causes the output voltage to drop periodically (negative spikes) at the switching transition time because the load current is applied to a node without reserve. This is the issue being usually solved by adding the filtering capacitor as an energy reservoir during transition time.

Figure 10:
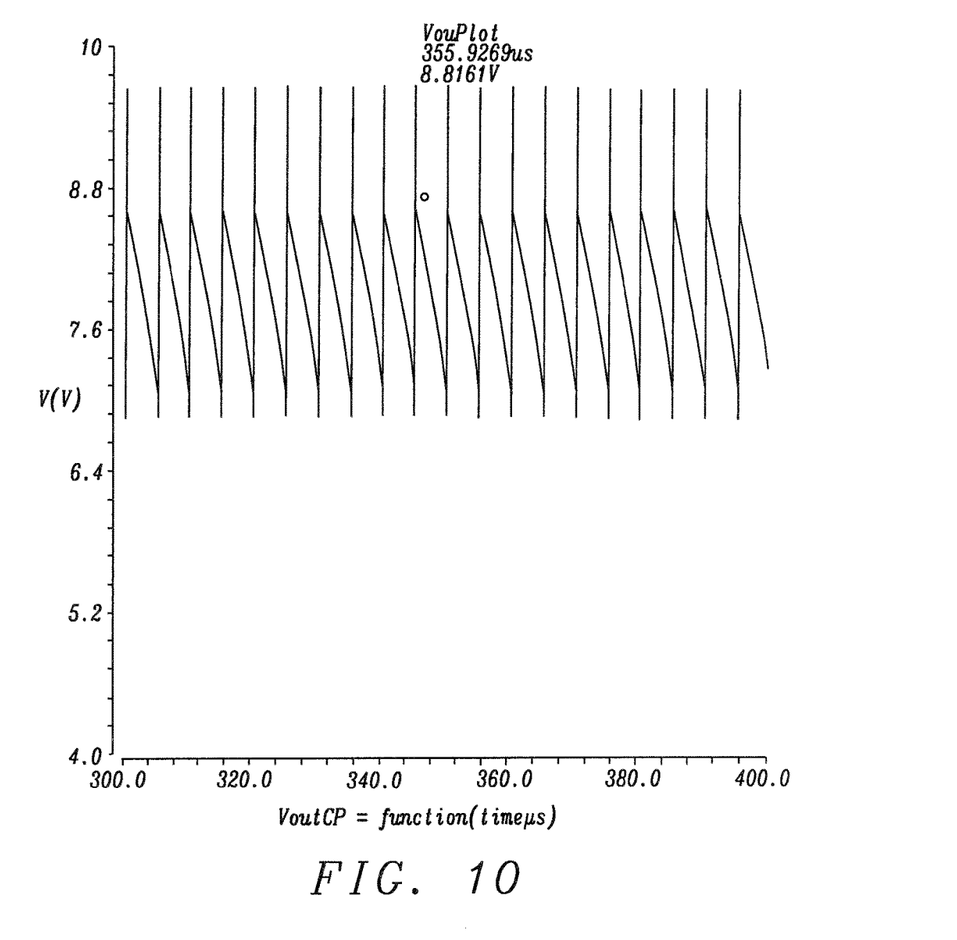
FIG. 10 illustrates a timing diagram of a third simulation of a first preferred embodiment of the present disclosure.

FIG. 10 illustrates a timing diagram of a simulation with Tmbb=50 ns (increasing), Cn=4.7 uF, and Cf=0 fF, in a first preferred embodiment of the present disclosure, for FIG. 5 charge pump with Cf capacitors removed. When flying capacitor CnA switches from discharging to charging, and CnB switches from charging to discharging, there is a small make-before-break time between switch S2A and switch S2B, when both S2A and S2B are on. The timing diagram mirrors FIG. 8 where a filtering capacitor was used and a break-before-make time recorded.

Figure 11:
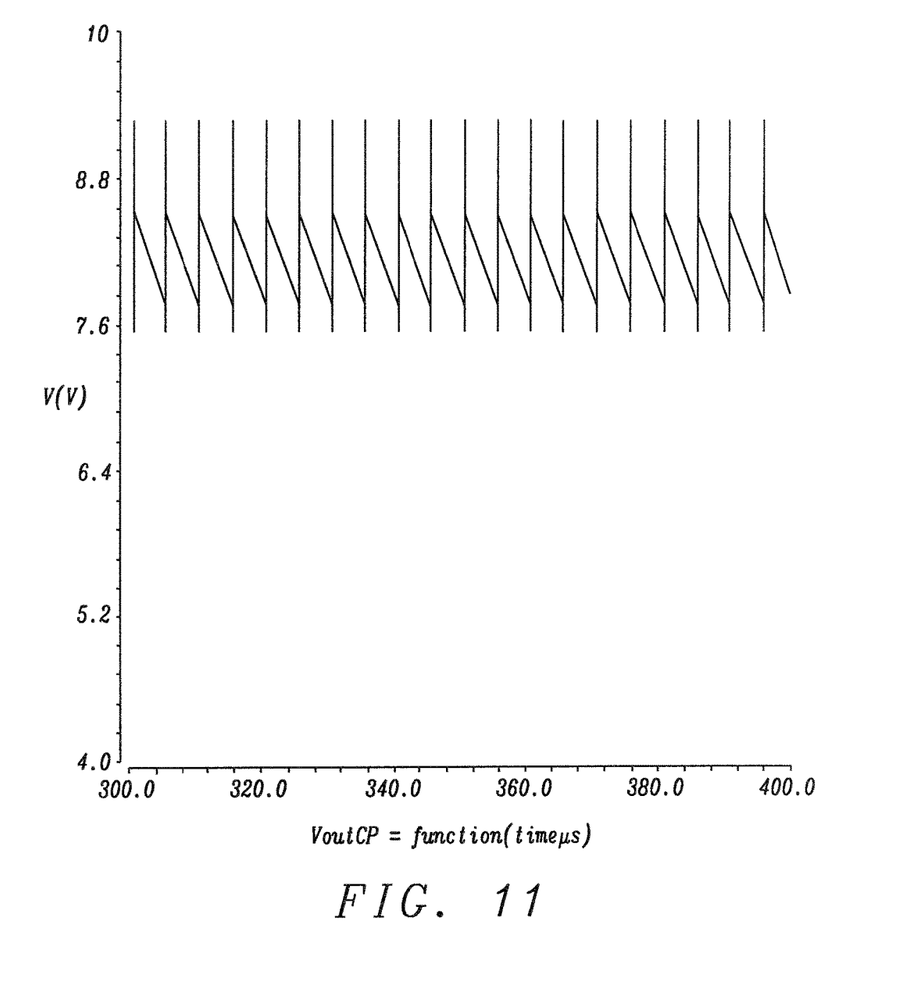
FIG. 11 illustrates a timing diagram of a fourth simulation of a first preferred embodiment of the present disclosure.

FIG. 11 illustrates a timing diagram of a simulation with Tmbb=50 ns, Cn=10 uF (increasing), and Cf=1 fF, in a first preferred embodiment of the present disclosure, for FIG. 5 charge pump with Cf capacitors removed. This is the case where the filter capacitor Cf is very small (essentially zero) and the flying capacitor Cn has increased. There is a small make-before-break time between switch S2A and switch S2B. With the larger Cn value, the timing diagram more closely resembles the timing diagram of FIG. 8 where a filtering capacitor was used and a break-before-make time is recorded.

Figure 12:
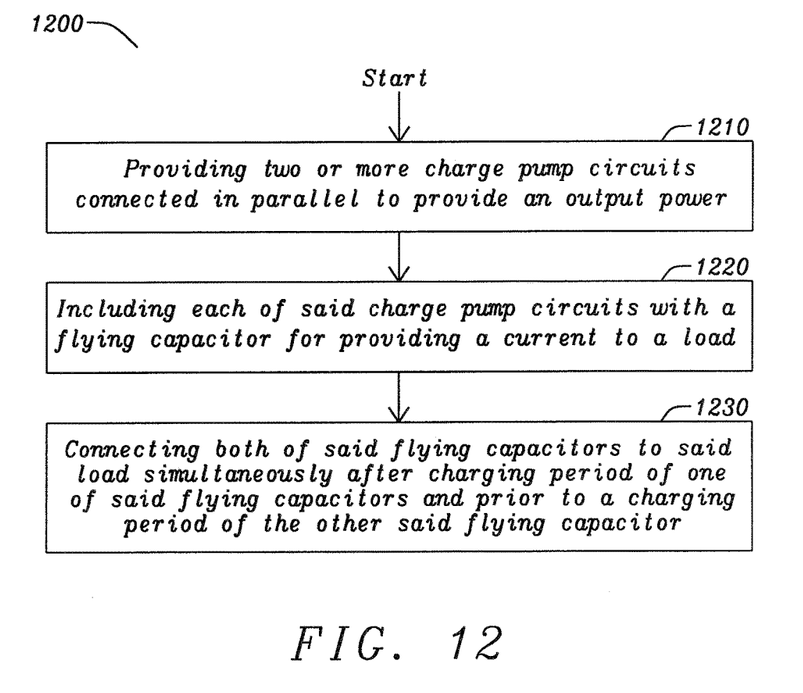
FIG. 12 shows a flowchart of a method for operating a switched-capacitor power electronic circuit.

FIG. 12 shows a flowchart of a method for operating a switched-capacitor power electronic circuit. Step 1210 of the method of 1200 shows the provision of two or more charge pump circuits connected in parallel producing an output power. Step 1220 depicts each of the charge pump circuits having a flying capacitor for providing a current to a load. Step 1230 illustrates the connection of both of the flying capacitors to a load simultaneously after a charging period of one of the flying capacitors and prior to a charging period of the other flying capacitor.

The advantages of one or more embodiments of the present disclosure include eliminating the requirement for the filter capacitor connected to the load of a charge pump circuit, thereby minimizing the number of external components in a high power DC-DC power converter while maintaining high efficiency and limited voltage ripple.

While this invention has been particularly shown and described with reference to the preferred embodiments thereof, it will be understood by those skilled in the art that various changes in form and details may be made without departing from the spirit and scope of the invention.

The invention claimed is:

1. A switched-capacitor power electronic circuit, comprising:
   two or more charge pump circuits connected in parallel, configured to provide an output power;
   each of said charge pump circuits having a flying capacitor for providing a current to a load; and
   said switched-capacitor power electronic circuit is configured to connect some of said flying capacitors to said load, in make-before break fashion, simultaneously after a charging period of one of said flying capacitors and prior to a charging period of the other said flying capacitor, wherein during a period when said one of said flying capacitors is being charged, and is disconnected from the load, the other said flying capacitor is still connected to the load.

2. The switched-capacitor power electronic circuit of claim 1, further comprising:
   a first plurality of switches of said charge pump circuits, connected to a source, configured to be open(off) to discharge a first of said flying capacitors and to be closed(on) to charge a second of said flying capacitors; and
   a second plurality of switches of said charge pump circuits, connected to a load, configured to be closed(on) to discharge said first flying capacitor and to be open(off) to charge said second flying capacitor of said charge pump circuits.

3. The switched-capacitor power electronic circuit of claim 2, wherein said second plurality of switches are operated in make-before-break fashion.

4. The switched-capacitor power electronic circuit of claim 2, wherein said first plurality of switches are operated in break-before-make fashion.

5. The switched-capacitor power electronic circuit of claim 1, where said load is a shared load, connected between said first charge pump circuit and said second charge pump circuit.

6. A method of operating a switched-capacitor power electronic circuit, comprising the steps of:
   providing two or more charge pump circuits connected in parallel, to provide an output power;
   wherein each of said charge pump circuits has a flying capacitor for providing a current to a load; and
   connecting both of said flying capacitors to said load, in make-before break fashion, simultaneously after a charging period of one of said flying capacitors and prior to a charging period of the other said flying capacitor, wherein during a period when said one of said flying capacitors is being charged, and is disconnected from the load, the other said flying capacitor is still connected to the load.

7. The method, of operating a switched-capacitor power electronic circuit of claim 6, comprising:
   closing a first switch, connected to a first source and first flying capacitor, to charge said first flying capacitor;
   closing a second switch, connected to a second flying capacitor and load, to discharge said second flying capacitor;
   opening said first switch and said second switch, and closing a third switch, connected to said first flying capacitor and load, to discharge said first flying capacitor;
   closing a fourth switch, connected to said second flying capacitor and second source, to charge said second flying capacitor; and
   producing a load current by said connecting both said flying capacitors to said load simultaneously.

8. The method of claim 7, wherein said second and third switches make-before-break when switching, with respect to each other.

9. The method of claim 7, wherein said first and fourth switches break-before-make when switching, with respect to each other.

10. A voltage multiplier electronic circuit, comprising:
    two or more charge pump circuits connected in parallel to the same voltage supply, configured to provide an output power;
    each of said charge pump circuits having a flying capacitor for providing a current to a load;
    said voltage multiplier electronic circuit is configured to connect each of said flying capacitors to said load, in make-before break fashion, simultaneously after a charging period of one of said flying capacitors and prior to a charging period of the other said flying capacitor, wherein during a period when said one of said flying capacitors is being charged, and is disconnected from the load, the other said flying capacitor is still connected to the load;
    a first plurality of switches of said voltage multiplier electronic circuit, configured to be open(off) to disconnect the voltage supply; and
    a second plurality of switches of said voltage multiplier electronic circuit, configured to be closed(on) to connect the flying capacitors in series.

11. The voltage multiplier electronic circuit of claim 10, where said flying capacitors connected in series provide a voltage that multiplies the voltage supply.

12. The voltage multiplier electronic circuit of claim 10, further comprising:
    a third plurality of switches, connected to a source, configured to be open(off) to discharge a first of said flying capacitors and to be closed(on) to charge a second of said flying capacitors; and
    a fourth plurality of switches, connected to a load, configured to be closed(on) to discharge said first flying capacitor and to be open(off) to charge said second flying capacitor of said charge pump circuits.

13. The voltage multiplier electronic circuit of claim 10, wherein said fourth plurality of switches are operated in make-before-break fashion.

14. The voltage multiplier electronic circuit of claim 10, wherein said third plurality of switches are operated in break-before-make fashion.

15. The voltage multiplier electronic circuit of claim 10, where said load is a shared load, connected between said first charge pump circuit and said second charge pump circuit.

* * * * *